April 3, 1934. F. W. LUTZ 1,953,304
MOUNT FOR AERIAL CAMERAS AND METHOD OF AERIAL PHOTOGRAPHY
Filed May 31, 1933 3 Sheets-Sheet 1
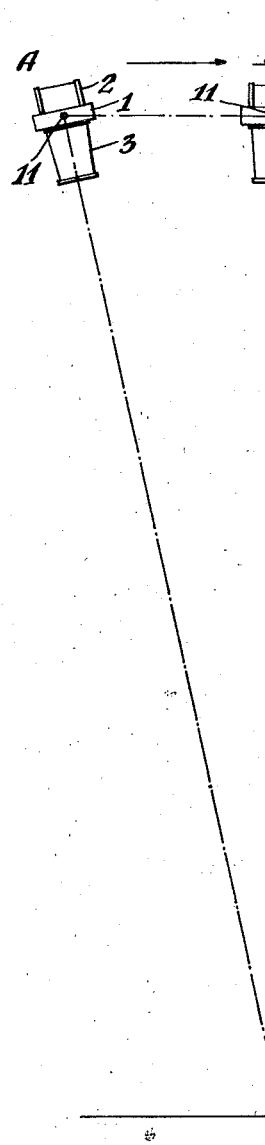
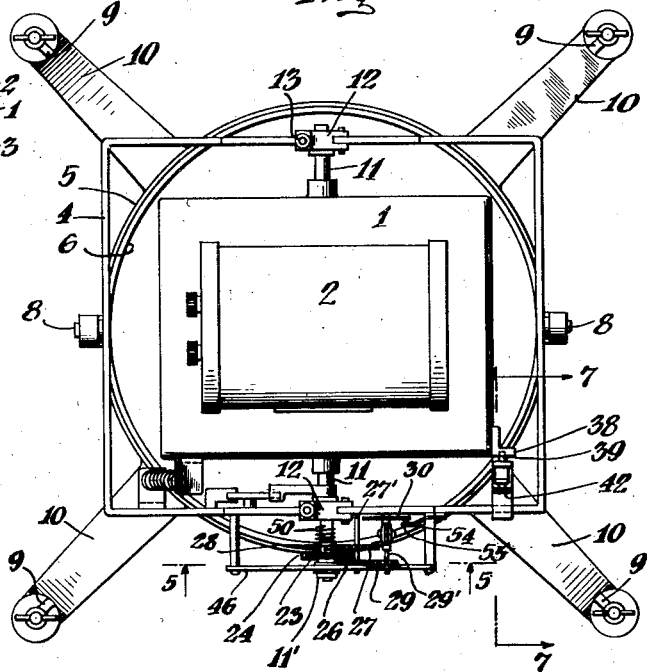
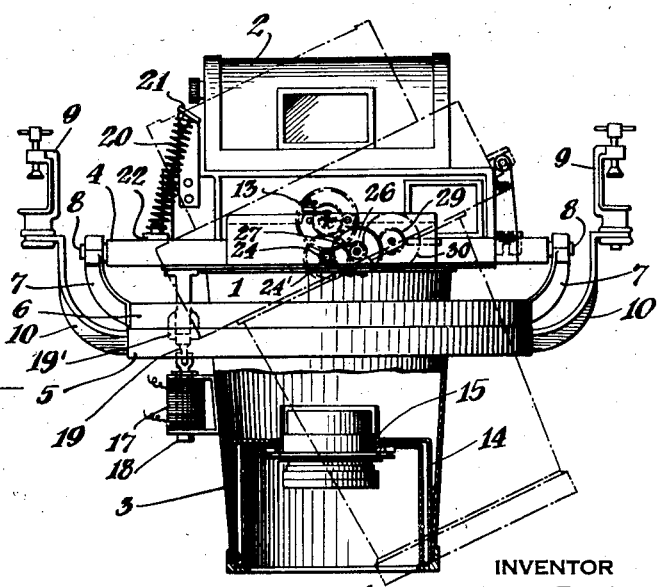
INVENTOR
Frederick W. Lutz
BY
Arquet & Neary
ATTORNEYS April 3, 1934. F. W. LUTZ 1,953,304
MOUNT FOR AERIAL CAMERAS AND METHOD OF AERIAL PHOTOGRAPHY
Filed May 31, 1933 3 Sheets-Sheet 2
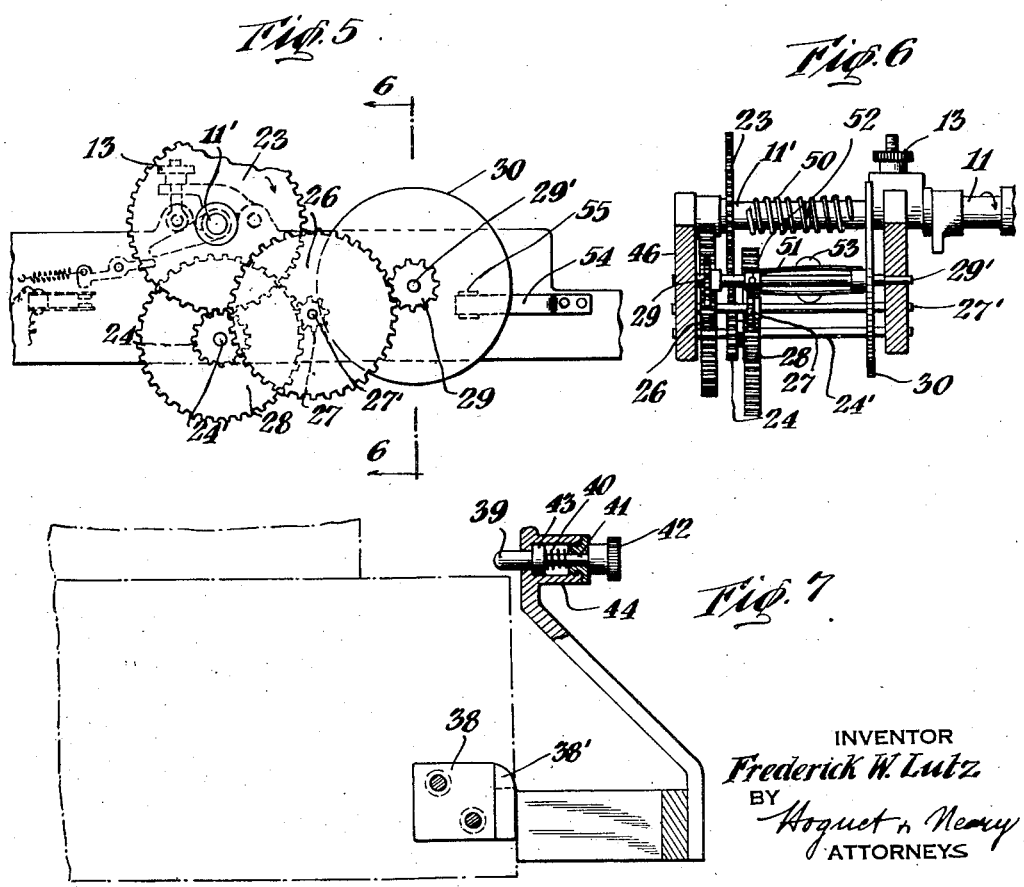
INVENTOR
Frederick W. Lutz
BY
Hoguet & Neary
ATTORNEYS April 3, 1934.     F. W. LUTZ     1,953,304
MOUNT FOR AERIAL CAMERAS AND METHOD OF AERIAL PHOTOGRAPHY
Filed May 31, 1933     3 Sheets-Sheet 3
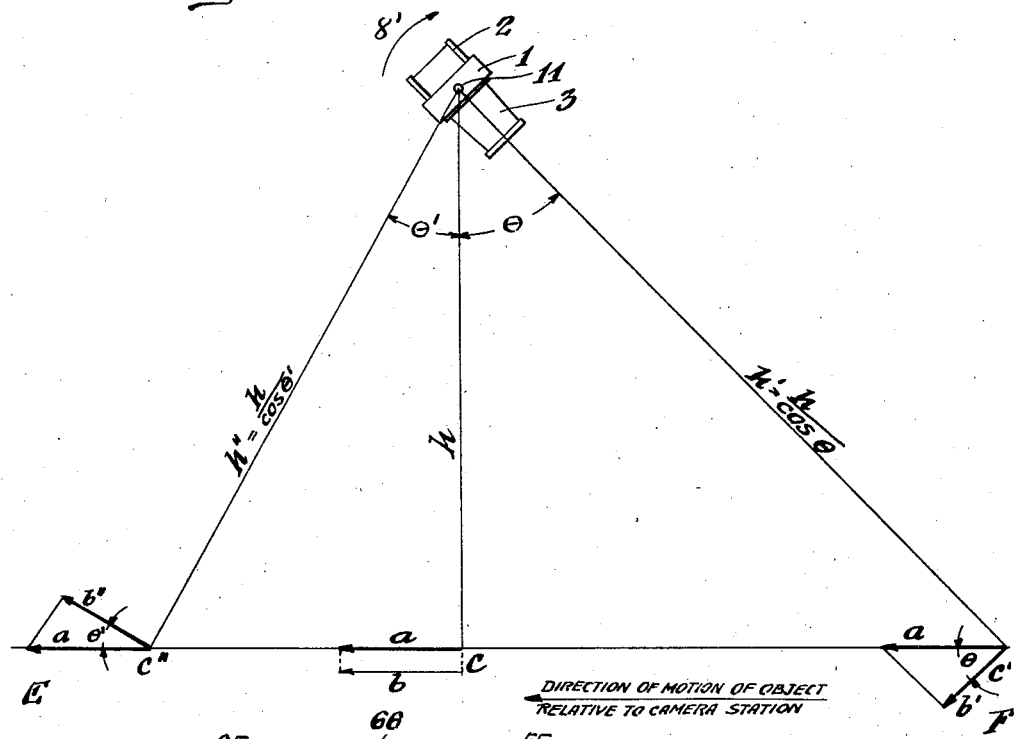
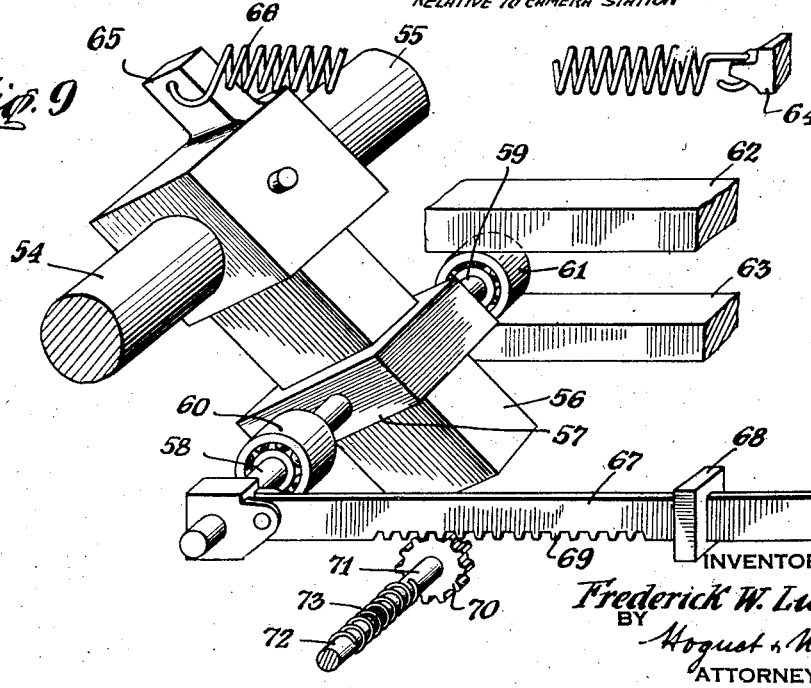
INVENTOR
Frederick W. Lutz
BY
August H. Heavy
ATTORNEYS Patented Apr. 3, 1934

1,953,304

UNITED STATES PATENT OFFICE 1,953,304

MOUNT FOR AERIAL CAMERAS AND METHOD OF AERIAL PHOTOGRAPHY

Frederick W. Lutz, Floral Park, N. Y., assignor to Fairchild Aerial Camera Corporation, Woodside, Long Island, N. Y., a corporation of New York Application May 31, 1933, Serial No. 673,603

10 Claims. (Cl. 95—12.5)

This invention relates in general to photographic apparatus and more particularly to a device for moving the camera at a controlled speed so as to synchronize its movement with the relative movement between the camera and the object and thereby neutralize the movement of the image on the negative.

An object of the invention is to provide a mount for a camera whereby the latter will be adapted to swing at a controlled speed either automatically or by hand so as to neutralize the motion of the image on the negative when there is relative movement between the object and the station of the camera.

A particular object of the invention is to provide such a mount that will be adaptable for use in aircraft and to provide means for swinging the camera backward or forward or in any predetermined direction of motion at a rate of speed proportional to the speed of travel of the airplane at a predetermined altitude for the purpose of neutralizing the movement of the image on the negative so as to permit a longer exposure without blur.

A further object is to provide such a mount that may be actuated by hand, by motor or other motivating means, and to provide the same with a regulating device for effecting any desired rate of movement for the purpose of neutralizing the movement of the image on the negative due to the relative movement between the camera and the object.

To this end it is proposed to employ as one method of photography, which consists in angularly disposing the camera to a certain known angle with respect to a certain normal position, and releasing the camera in such set position at a predetermined instant, the time interval consumed by the regulated return movement of the camera to normal and the relative motion and distance between the camera and the object being so calculated that the object will enter the field of the camera and will be photographed while the camera is in motion and at the instant the optical axis of the camera is passing through the normal position with regard to the object.

As another method of photography of moving objects it is proposed to incorporate in the mechanism that controls the angular movement of the camera a device which will correct the angular velocity of the camera in such a manner that the image would remain at a relatively fixed point on the focal plane during the entire period of angular motion of the camera, if the shutter were to remain open. The camera can then be pointed at a moving object and the mechanism released after which the camera will move at a constantly varying rate of angular velocity and will at all times during the period of its operation maintain the object in the center of the camera field. It follows then that at any time during this period the shutter may be opened for a relatively slow exposure and the effects of object movement to cause image blur will be minimized.

With the foregoing and other objects in view, the invention consists in the details of construction and in the combination of parts hereinafter set forth in the following specification and appended claims, certain embodiments thereof being illustrated in the accompanying drawings, in which:

Figure 1 is a diagrammatic representation of the relation between the camera when angularly disposed with respect to the object on the ground and its subsequent substantially vertical position as the camera passes over the photographed object.

Figure 2 is a top plan view of the device including the mount for the camera.

Figure 3 is a view in side elevation of the camera and the mount and moving apparatus in vertical position, the adjusted angular position of the camera being shown by dotted lines, part of the camera cone being broken away to show in side elevation the lens.

Figure 4 is a view in side elevation of the device showing the shutter tripping device including the solenoid.

Figure 5 is a detailed view in elevation of the device for regulating the speed of return of the camera from its set angularly disposed position to the normal vertical one.

Figure 6 is a view in section taken along lines 6—6 of Figure 5.

Figure 7 is an enlarged detailed view of a push button stop device for retaining the camera in its set angularly disposed position.

Figure 8 is a view similar to Figure 1 with lines and angles illustrating various movements of the camera about its pivot.

Figure 9 is a detail view in perspective of a modified form of speed regulating device for the camera.

Referring more particularly to the drawings, attention is called to Figure 1 which shows diagrammatically the camera which may be carried by an aircraft traveling in the direction of the arrow indicator. In the position shown at A the camera is pointed ahead so as to be concentrated on the object C. By means of mechanism which will be hereafter fully described, the camera after having been thus pointed is allowed to return to the vertical position shown at B at a predetermined speed in such a manner that if the camera is in the latter position it will still be moving around its pivot 11 so that the speed of its angular movement will be equal to and in the opposite direction to the actual forward movement of the camera caused by it being carried by the airplane, and thus counteract the apparent or relative movement between the object and the camera so that the movement of the image on the negative will be neutralized.

To bring this desired result about, any suitable camera mount may be employed such as illustrated diagrammatically in Figure 1. That is, in order to neutralize the movement of the image on the negative in a purely longitudinal plane, it would be necessary only to provide the camera with a lateral axis. In order, however, to compensate for relative movement between the camera and the object desired to be photographed in any plane it is preferred to use a universally mounted camera. Such a camera mount may consist of the well-known gimbal variety as shown in Figures 2 and 3 which comprise of a gimbal ring or frame 4 to which the camera body 1 may be attached by means of shafts 11 maintained between bearing members 12 releasably clamped by means of nuts 13. By referring to Figure 3 it will be seen that the remainder of the camera casing consists of a magazine housing 2 and a cone 3, the weight being so distributed that the axis 11 will represent the center of gravity and the camera will have no pendulum action. In certain cases it may be desired to rotate the camera about the optical center of the lens in which case the center of gravity can be corrected. The gimbal mount further consists of an annular carrier 5 and a rotatable carrier ring 6, the latter being provided with upwardly disposed arms 7 for rotatable connection with a shaft 8. The shaft 11 allows for relative movement about one axis between the camera and the mount, the rotatable carrier ring 6 allows for rotary movement of the camera with respect to the stationary part of the mount and the shaft 8 allows for a rotary movement of the carrier ring with respect to the gimbal frame so as to provide a universally movable camera. The annular ring 5 is provided with upstanding arms 10 which are connected to clamping devices generally indicated at 9 for suitable attachment with some portion of the aircraft frame.

It is appreciated that a number of means may be employed for regulating the return movement of the camera to the vertical at a predetermined speed and extent of angular movement. One of such types of mechanism shown in the drawings for the purpose of illustration may consist of a compression spring 20 which may be secured to a bracket 21 carried by the camera, the spring being connected at its other end to the gimbal frame 4 at 22 or at any other location which may be found desirable, the purpose being to return the camera to the normal predetermined vertical position after it has been manually or otherwise moved from such position. The means for retarding and for regulating the rate of movement of the camera from its set angular position to its normal vertical position may consist of a series of reduction gears shown in Figures 5 and 6.

The shaft 11 forming the lateral pivoting point of the camera to the gimbal frame is connected to a short shaft 11' by means of a coil spring 50 wrapped around the adjacent portions of the two shafts and secured to each so as to form a spring clutch. This clutch provides a means whereby the shaft 11' is actuated by shaft 11 as the camera returns from its angular set position to its normal or predetermined position and also makes it possible to rotate the camera to an angular position without any driving effect being imparted to the short shaft 11'. This shaft 11' may be provided with suitable bearings in a frame 46 for carrying the same. The shaft 11' carries a gear 23 which meshes with a smaller gear 24 mounted on a shaft 24'. Also carried by shaft 24' is a similar large gear 28, which meshes with a smaller gear 27 carried on a shaft 27', which latter shaft 27' carries a large gear 26 adapted to mesh with the small gear 29 carried on a shaft 29'. Also carried by the shaft 29' is a flywheel 30 and a governor, which consists of spring leaves 51 connected to the shaft at 52 and provided with centrifugal weights 53, the flywheel being slidable on the shaft 29' and secured to the spring leaf 51. There may also be provided a bracket 54 secured to the frame with an adjustable pad 55 for contact with the flywheel 30 as the governor is extended, as is shown in Figure 6.

Thus, it will be seen that as the camera is released from the position shown in Figure 1 at A, the gear train, flywheel and governor are all coming into play and regulating the return movement of the camera to the normal vertical position shown at B so as to regulate the speed of movement and the extent thereof. In order to maintain the camera in the adjusted position shown at A in Figure 1, any suitable device may be used such as shown in Figures 2 and 7 and may consist of a bracket 38 formed on the camera with a catch 38' to receive a pin 39 carried by the stationary portion of the mount or of the gimbal frame as may be desired. This pin may be spring pressed by a coil spring 40 and be carried by an extension 41 to which a hand knob 42 may be secured. The pin may also be provided with an enlargement 43 arranged within a suitable housing 44 as indicated in Figure 7.

It may be desired to provide a mechanism for automatically keeping the object within the range of the camera field during its return movement from an angular set position and with this in mind there has been provided a modified form of speed regulating device as particularly shown in Figure 9. This consists of a camera mount bearing 54 and a camera trunnion 55 extending to the camera. There is also provided a trunnion pitman arm 56 with a sliding sleeve 57 arranged thereabout, the sleeve being provided with pins 58 and 59 with roller bearing assemblies 60 and 61 adapted for rotary movement between an upper track 62 and a lower track 63. These tracks 62 and 63 are shown in connection with the roller bearing 61 and it will be understood that a similar arrangement is also provided for the roller 60 but this is not shown in the drawings for purposes of convenience. The member shown at 64 represents a lug on a suitable portion of the camera mount and, between this lug and a similar one on the trunnion pitman arm and shown at 65, is arranged a coil spring 66 for driving the camera from its angular set position to a predetermined normal one. In order to regulate the speed of this movement there is provided a drive rack 67 slidably mounted in a suitable guide 68 and having teeth 69 adapted to mesh with a rack pinion 70 to retard and govern the speed of the rack as the shaft 71 carrying the pinion is rotated in a counter clockwise direction. In order to arrange the mechanism so that the camera may be easily shifted to an angularly set position without operating the speed regulating device, there is provided a suitable spring clutch consisting of a complementary shaft 72, around which shafts 71 and 72 is arranged a spring 73 which is attached to both of the shafts at its ends. This spring clutch allows the return movement of the camera to a starting position by the spring actuation in the opposite direction and provides a driving means for the speed regulating device as the camera goes through its return movement. This is provided for by the shaft extending to the governed speed clockwork and constitutes a manual speed adjustment to compensate for the distance of the object and the relative linear velocity. The particular type and arrangement of the mechanism shown in Figure 9 for the camera drive is adapted to fulfill the angular velocity condition $$\delta\alpha' = \alpha (\cos\theta)^2.$$

The tracks maintain the driving point substantially parallel to the object plane. The drive rack is allowed to move at a linear velocity proportional to the linear velocity of the object, the proportion being expressed by $$\frac{d}{h},$$

where $d$ represents the normal distance from the camera trunnion axis to the plane of movement of the ball bearing centers and $h$ represents the normal distance from the camera to the object plane. In other words, as an example, given a normal distance $(d)$ from the trunnion center to the plane of movement of the ball bearing centers as 2 inches, and $h$ as 2,000 feet or 24,000 inches, then if a relative linear velocity $(a)$ of the camera and the object is 10,000 feet per minute, the velocity of the rack $(v)$ equals $$\frac{d}{h} \times a = \frac{2}{24,000} \times 10,000 = .833$$

feet per minute. Since the instantaneous angular velocity of the camera $\delta\alpha'$ at any point in its travel equals $$v \frac{(\cos\theta)^2}{2\pi d},$$

by substituting for $v$ the equation $$\left(v = \frac{d}{h} \times a\right),$$

then $$\delta\alpha' = \frac{\frac{d}{h} \times a(\cos\theta)^2}{2\pi d},$$

and I have $$\delta\alpha' = \frac{a(\cos\theta)^2}{2\pi h},$$

which is the condition to be satisfied.

Referring more particularly to Figure 8, the basic angular velocity $\alpha$ of the camera when the optical axis is normal to the object plane, is dependent upon the normal distance $h$ from the camera to the object and the relative linear velocity expressed by vector $a$, and may be expressed by the equation $$\left(\alpha = \frac{a}{2\pi h}\right),$$

where $\alpha$ represents revolutions per minute, $a$ represents linear velocity in feet per minute and $h$ represents the normal distance in feet. However, for any angle other than a right angle, the angular velocity of the camera should be modified in order to retain the image of the object in a relatively fixed position on the focal plane. Such modification will depend on the angle that the optical axis of the camera makes with the perpendicular $(h)$ to the object plane. If this angle is termed $\theta$ the angular velocity at any point of the camera travel varies as the basic angular velocity $\alpha$ multiplied by the square of the cosine of the angle $\theta$ for that particular instant.

Figure $(x)$ represents the camera 1 pivoted about 11, the object plane EF, which has relative linear velocity with respect to the camera, represented by vector $a$. Points C, C', and C'' represent various positions of an object during its transit with respect to the camera station. Vectors $b$, $b'$, and $b''$ represent the effective linear velocity of the object at various positions with respect to the optical axis of the camera. These vectors are equal to $(ax \cos\theta)$ and act at a distance $h'$ equal to $$\frac{h}{\cos\theta}.$$

By substituting in the original equation $$\left(\alpha = \frac{a}{2\pi h}\right)$$

the instantaneous values $b'$ and $h'$ I have $$\delta\alpha' = \frac{b'}{2\pi h'}$$

or $$\delta\alpha' = \frac{a \times \cos\theta}{2\pi\left(\frac{h}{\cos\theta}\right)} = \frac{a \times (\cos\theta)^2}{2\pi h} = \alpha(\cos\theta)^2.$$

This continuous mathematical variation in angular velocity of the camera may be secured by various means of which I show a preferred means in Figure 9. Other methods such as irregular shaped gears, cams, or linkage systems may be used.

Thus it will be seen that there has been provided a photographic device particularly adapted for aerial photography from relatively low altitudes and high speed airplanes or under poor light conditions, as well as ordinary photography of moving objects.

There has also been provided a positive means for synchronizing the movement of the camera with respect to the object to be photographed so as to neutralize the movement of the image upon the photographic negative. There has also been provided a positive means for adjustment of the various devices so that the control of movement of the camera may be predetermined so as to be suitable for a wide range of existing conditions. While this device is particularly adapted for use in connection with aerial photography, the scope of the invention is in no case limited thereto as the principles involved are likewise applicable to ordinary photography whether the station of the camera be fixed with respect to the moving object or vice versa, or indeed, whether both the object and the station of the camera are moving but at a different rate of speed or in a different direction.

I claim:

1. In a photographic apparatus, including a camera and a mount therefor for permitting angular movement of the camera, means for rotating said camera about an axis perpendicular to its optical axis and means operated by the angular movements of said camera to regulate the rate of speed and extent of such angular travel, and means for automatically effecting a photographic exposure during the return movement of the camera as it reaches any desired position.

2. In a photographic apparatus, including a camera and a mount therefor for permitting angular movement of the camera, means for returning said camera to a predetermined position after the camera has been adjusted to a position other than said predetermined position, and means operated by the angular movements of said camera upon its return to regulate the rate of speed and extent of such return travel, said means comprising a train of reduction gears, one of which is operated by the means constituting the pivot axis of said camera, and the gear at the other end of said train being in driving connection with a governor, and means for automatically effecting a photographic exposure during the return movement of the camera as it reaches said predetermined position.

3. In a photographic apparatus, including a camera and a mount therefor for permitting angular movement of the camera, means for returning said camera to a predetermined position after the camera has been adjusted to a position other than said predetermined position, and means operated by the angular movements of said camera upon its return to regulate the rate of speed and extent of such return travel, said means comprising a train of reduction gears, one of which is operated by the means constituting the pivot axis of said camera, the gear at the other end of said train being in driving connection with a governor, and releasably, manually operated device for retaining said camera in an angularly disposed adjusted position, and means for automatically effecting a photographic exposure during the return movement of the camera as it reaches said predetermined position.

4. In a photographic apparatus, including a camera and a mount therefor for permitting angular movement of the camera, means for returning said camera to a predetermined position after the camera has been adjusted to a position other than said predetermined position, and means operated by the angular movements of said camera upon its return to regulate the rate of speed and extent of such return travel, and means actuated thereby for tripping said shutter.

5. In a photographic apparatus, including a camera and a mount therefor for permitting angular movement of the camera, means for returning said camera to a predetermined position after the camera has been adjusted to a position other than said predetermined position, and means operated by the angular movements of said camera upon its return to regulate the rate of speed and extent of such return travel, said last named means comprising a solenoid adapted to be energized upon the return of said camera to a predetermined position.

6. In a photographic apparatus, including a camera and a mount therefor for permitting angular movement of the camera, means for returning said camera to a predetermined position after the camera has been adjusted to a position other than said predetermined position, and means operated by the angular movements of said camera upon its return to regulate the rate of speed and extent of such return travel, said means comprising a train of reduction gears, one of which is operated by the means constituting the pivot axis of said camera, and the gear at the other end of said train being in driving connection with a governor, a shutter tripping means actuated by the swinging movement of said camera to a predetermined position.

7. A method of aerial photography involving the use of a camera in a predetermined position by an aircraft, but angularly adjustable with relation thereto which method consists in the tilting of the camera at an angle in advance of said predetermined position, initiating the return movement of the camera when the object desired to be photographed comes into the camera field, which movement continues at a predetermined rate of speed and extent of travel while the camera remains still pointed at the object, and causing the camera to take a photographic exposure of the object as the camera passes through said predetermined position.

8. In a photographic apparatus, including a camera and a mount therefor for permitting angular movement of the camera, means for rotating said camera about an axis perpendicular to its optical axis, and means operated by the angular movements of said camera to regulate the rate of speed and extent of such angular travel, and means for effecting a photographic exposure during the return movement of the camera as it reaches any desired position.

9. In a photographic apparatus, including a camera and a mount therefor for permitting angular movement of the camera, means for rotating said camera about an axis perpendicular to the optical axis, and means operated by the angular movement of said camera to regulate the rate of speed and extent of such angular travel for insuring such angular rotation of the camera that the optical axis thereof will shift the constantly varying angular velocity in order to maintain a fixed relation with an object having a constant linear velocity relative to the camera station.

10. In a photographic apparatus, including a camera and a mount therefor for permitting angular movement of the camera, means for rotating said camera about an axis perpendicular to its optical axis, and means operated by the angular movement of said camera to regulate the rate of speed and extent of such angular travel for insuring an angular velocity of camera rotation which will vary substantially according to the square of the cosine of the instantaneous angle between the optical axis of the camera and a normal to the object plane.

FREDERICK W. LUTZ.